United States Patent [19]

Steuer

[11] 4,119,182
[45] Oct. 10, 1978

[54] TWO-SPEED BICYCLE HUB WITH COASTER BRAKE AND PEDAL ACTUATED SPEED SHIFT

[75] Inventor: Werner Steuer, Schweinfurt am Main, Germany

[73] Assignee: Fichtel & Sachs AG, Schweinfurt am Main, Germany

[21] Appl. No.: 819,325

[22] Filed: Jul. 27, 1977

[30] Foreign Application Priority Data

Aug. 10, 1976 [DE] Fed. Rep. of Germany ....... 2635850

[51] Int. Cl.² ............................................. B60K 29/02
[52] U.S. Cl. .................................................. 192/6 A
[58] Field of Search ........................................ 192/6 A

[56] References Cited

U.S. PATENT DOCUMENTS

| 3,648,809 | 3/1972 | Schwerdhofer | 192/6 A |
| 3,878,737 | 4/1975 | Schulz | 192/6 A |

Primary Examiner—Benjamin W. Wyche
Attorney, Agent, or Firm—Hans Berman

[57] ABSTRACT

In a hub for the rear wheel of a bicycle, pawl-and-ratchet clutches connect the planet carrier and the ring gear of a planetary gear transmission with ratchet teeth on the hub shell. The pawls on the faster turning ring gear may be retracted by an annular cam face on a control ring whose position relative to the pawls is shifted by back-pedaling. The configuration of the cam face is such as to prevent interference of a coaster brake, also actuated by back-pedaling, with the speed shifting action and vice versa.

14 Claims, 6 Drawing Figures

TWO-SPEED BICYCLE HUB WITH COASTER BRAKE AND PEDAL ACTUATED SPEED SHIFT

This invention relates to multiple-speed hubs for driven wheels of bicycles and like vehicles, and particularly to a multiple-speed hub equipped with a coaster brake actuated by back-pedaling and with a speed-shifting mechanism which is also actuated by backward angular movement of members of a planetary gear transmission in the hub.

More specifically, this invention is concerned with an improvement in the bicycle hub disclosed and claimed in the commonly owned Schwerdhofer U.S. Pat. No. 3,648,809. The known hub, while fully effective, is relatively complex and requires, in addition to the actual control elements for shifting the transmission ratio of the hub, at least one additional element to prevent mutual interference of a coaster brake and of the speed shifting mechanism both of which are actuated by back-pedaling.

More specifically, the known hub is equipped with a planetary gear transmission driven by a sprocket and provided with two pawl-and-ratchet clutches operatively interposed between respective transmission members simultaneously rotating at different speeds and the hub shell. One of the clutches may be engaged and disengaged by a control element rotatably mounted in the hub shell and carrying an annular cam face for co-operation with the controlled pawl. In order to prevent mutual interference between the coaster brake and the speed shifting mechanism, the controlled pawl cooperates with ratchet teeth on an intermediate ring, and it has been found necessary to permit some angular movement between the ring and the hub shell so that the coaster brake may be fully disengaged before torque is again transmitted to the hub shell by the controlled pawl during forward pedaling.

It is a primary object of this invention to avoid the need for the afore-mentioned intermediate ring by a suitable configuration of the cam face on the control element.

The cam face in the control element of the invention has first and second circumferential sections each of which has an arcuate, circumferential portion adjacent the hub axis, a circumferential portion sloping radially outward from the adjacent portion toward the adjacent portion of the other section in the circumferential direction of pedal-driven, forward, angular movement of the transmission member on which the associated pawl is mounted, and an abutment portion transverse to the adjacent and control portions. When a cam follower portion of the pawl engages the control portion of the first section, a tip portion of the pawl can engage a ratchet on the hub shell. It cannot reach the hub shell when the cam follower portion engages the control portion of the second cam face section or either adjacent portion. The pawl abuttingly engages the abutment portion of the control element during forward pedaling for rotating the control element about the hub axis with the pawl.

The circumferential length of the adjacent portion of the first cam face section is approximately two thirds of the combined circumferential length of the adjacent and control portions of the first cam face section. The circumferential length of the adjacent portion of the second cam face section is 25 to 50% of the combined circumferential length of the adjacent and control portions of the second section.

A friction brake selectively impedes rotary movement of the control element with the pawl during back-pedaling so that the cam follower portion of the pawl moves from camming engagement with one of the first and second cam face sections into camming engagement with the other section. The adjacent cam face portion of at least the first section is made long enough to permit releasing of the associated coaster brake during forward pedaling before the cam follower portion engages a control portion of the cam face.

Other features, additional objects, and many of the attendant advantages of this invention will readily be appreciated as the same becomes better understood from the following detailed description of a preferred embodiment and of a modification thereof when considered in connection with the appended drawing wherein.

Figure 1:
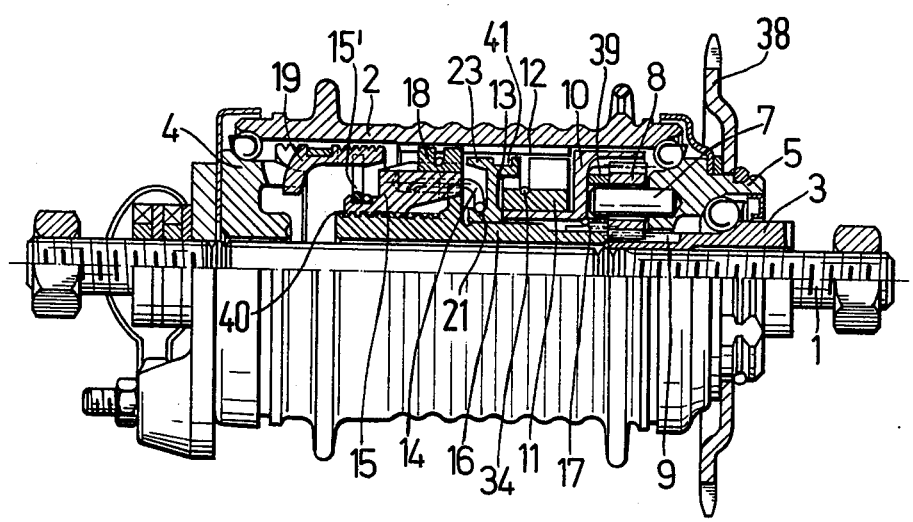
FIG. 1 shows a multiple-speed hub of the invention in rear elevation, and partly in section on its axis.

Referring initially to FIG. 1, there is seen a two-speed hub with coaster brake which is supported on a normally stationary shaft 1 in the rear wheel fork of a bicycle, not itself shown. Axially spaced inner bearing elements 3, 4 fixedly fastened on the shaft 1 carry respective sets of bearing balls. An annular driver 5 is rotatably mounted on the bearing element 3 and carries a sprocket 38 for engagement by a drive chain, not shown. A hub shell 2 is coaxially mounted on the shaft 1 by means of bearing balls on the bearing element 4 and the drive 5.

The hub shell 2 encloses a planetary gear transmission in which the driver 5 serves as a planet carrier. Planet shafts 7 are equiangularly distributed on the driver 5 about the axis of the shaft 1 and carry respective planet gears 8. The planet gears 8 simultaneously mesh with a sun gear 9 integral with the bearing element 3 and with internal teeth of a ring gear 10. A tubular hub portion of the ring gear is rotatably supported on a drive sleeve 16 and carries two diametrically opposite pawls 11. The sleeve 16 is permanently coupled to the drive 5 for joint rotation by interengaged axial projections and recesses 17 and by a disc 39 secured against rotation on the sleeve 16 and engaged by the planet shafts 7.

A control ring 13 is rotatably supported on the drive sleeve 16 axially adjacent the pawls 11 as will presently be described in more detail. The end of the sleeve 16 remote from the driver 5 is coarsely threaded, and a brake cone 15 is movably mounted on the threads 40 of the cone 15 and frictionally engaged by a wire spring 15' which tends to move the cone 15 toward the driver 5 during forward pedaling and in the opposite axial direction during back-pedaling. A second pair of pawls 18 is mounted on the cone 15. Ratchet teeth 12 on the inner face of the hub shell 2 are axially long enough for engagement by the pawls 11, 18. A split brake sleeve 19 is secured against rotation to the bearing element 4 and is expanded into frictional engagement with a smoothly cylindrical inner face portion of the hub shell 2 when the brake cone 15 moves axially on the threads 40 away from the driver 5 during back-pedaling, as is known in itself, the friction spring 15' being secured to the sleeve 19.

Another wire spring 14 is fixedly fastened to the brake cone 15 and frictionally envelops a central portion of the control ring 13 in a conforming, radially open groove 21 of the ring. A radially inner cam face of an axially short, tubular portion 41 of the ring 13 envelops an axial part of each pawl 11 and is shown in more detail in FIGS. 2 and 5.

Figure 5:
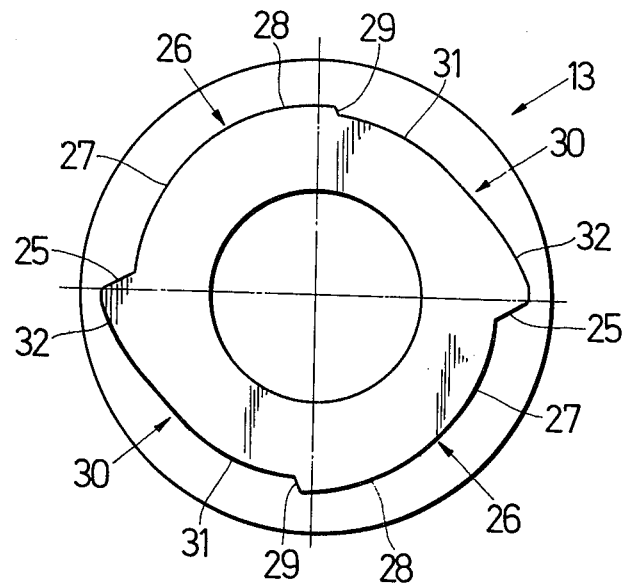
FIG. 5 illustrates the ring of FIG. 2 on a larger scale.

As is best seen in FIG. 5, the cam face of the ring 13 has two pairs of arcuate circumferential sections 26, 30. Each section spirals outward from the hub axis, which is also the axis of rotation of the ring 13, in a clockwise direction, as viewed in FIG. 5. The radially outermost end of each section 26 is joined to the adjacent, radially innermost end of a section 30 by a short approximately planar face portions 29 which is inclined relative to the joined sections almost at right angles. A similar, but longer face portion 25 joins the radially outermost end of each section 30 to the adjacent, radially innermost end of a section 26. The sections 26, 30 are approximately equal in length.

Figure 2:
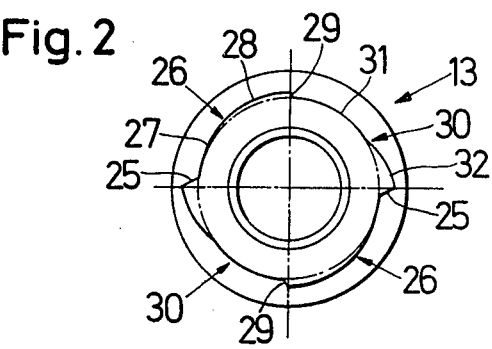
FIG. 2 illustrates a control ring in the hub of FIG. 1 in side elevation.

As is indicated more clearly in FIG. 2, the radially innermost end portions 27, 31 of the sections 26, 30 are cylindrical about the hub axis and of equal diameter. The portion 27 amounts to 25 to 50% of the circumferential length of the section 26, the remainder of 75 to 50% being constituted by a cylindrically arcuate portion 28 whose axis of curvature is offset from the hub axis so that it slopes radially outward from the portion 27. The coaxially cylindrical end portion 31 extends over approximately 65% or two thirds of the section 30, and the end portion 32 which constitutes the remaining one third or 35% has a smaller radius of curvature centered outside the hub axis and extends farther away from the hub axis than the end portion 28 of the cam face section 26.

Figure 3:
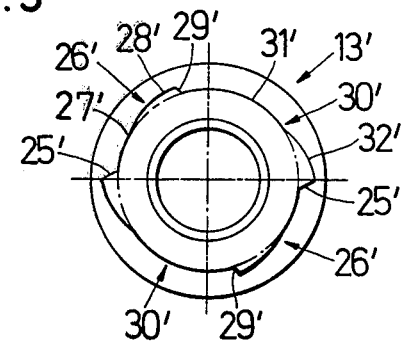
FIG. 3 shows a modified control ring for use in the hub of FIG. 1 in side elevation.

The dimensional relationship of the two types of cam face sections 26', 30' is modified in the control ring 13' illustrated in FIG. 3. Each section 26' extends about the hub axis in an arc of approximately 70°, while each section 30' has a length of approximately 110°. The relationship of the coaxial cam face portions 27', 31' and eccentric cam face portions 28', 32' within each section 26', 30', however, is the same as described with reference to FIG. 2.

Figure 6:
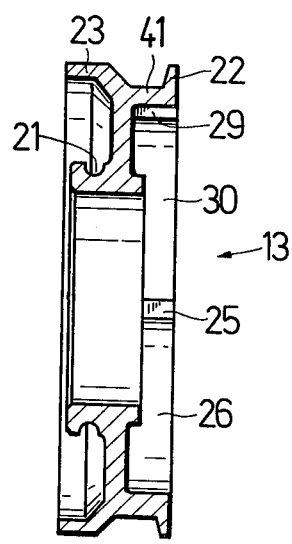
FIG. 6 shows the ring of FIG. 5 in rear-elevational section on the hub axis.

As is seen best in FIG. 6, a radial, annular, guide flange 22 projects outward from the free edge of the tubular ring portion 41, and a radially enlarged, tubular spacer portion 23 of the ring 13, approximately equal in diameter to the guide flange 22 spacedly envelops the afore-mentioned groove 21 for the friction spring 14. The outer diameter of the flange 22 and of the tubular portion 23 is only slightly smaller than the internal diameter of the sprocket teeth 12. The spacer portion 23 is axially juxtaposed to the pawls 18 on the brake cone 15 in the normal driving position of the cone illustrated in FIG. 1.

Figure 4:
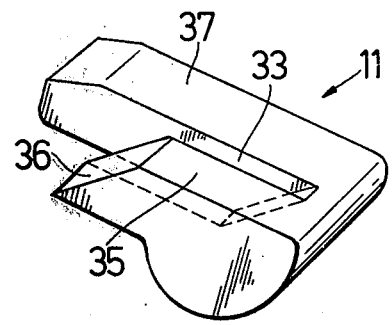
FIG. 4 is a perspective view of a pawl in the hub of FIG. 1 which is controlled by the ring of FIG. 2 or 3.

One of the two identical pawls 11 is shown in the perspective view of FIG. 4 on a larger scale than in FIG. 1. The pawl 11 is pivotally mounted on the ring gear 10 without shafts or pins, as is known, and is formed with a slot 33 normally received a pawl spring 34 (FIG. 1) common to both pawls and biasing the pawls toward engagement with the ratchet teeth 12 on the hub shell 2, the bottom face of the slot 33 being suitably inclined. The slot 33 separates a narrower, shorter tongue 35 of the pawl from a wider and longer tongue 37. The tongue 35 cooperates as a cam follower with the cam face of the ring 13 to control engagement between the tip of the tongue 37 and the ratchet teeth 12. An oblique end face 36 of the tongue 35 is parallel to the bottom face of the slot 33 for smooth cooperation with the control ring.

The afore-described two-speed hub operates as follows:

During forward pedaling at the lower of the two speeds, the pawls 18 are turned by the driver 5, the sleeve 15, and the brake cone 15 and transmit their motion to the permanently engaged ratchet teeth 12 on the hub shell 2 as long as the pawls 11 on the faster turning ring gear 10 are held out of engagement with the ratchet teeth by the cam face section 29. The hub shell 2 rotates at the same speed as the driver 5.

If a higher transmission ratio is desired, the drive 5, is briefly turned in the opposite direction by back-pedaling. The cone 15 stops turning and starts moving axially away from the driver 5 due to the action of the spring 15'. The pawls 11 on the ring gear 10 turn backward faster than the drive sleeve 16. The control ring 13 is held stationary by the friction spring 14, and tongues 35 of the pawls 11 move relative to the ring 13 from the cam face section 26 over the face portion 29 to the section 30 whose end or control portion 32 permits radially outward movement of the tongue 37 into driving engagement with the teeth 12 on the hub shell 2. When forward pedaling is resumed, the tongues 35 abut against the face portions 25 and turn the ring 13 so that the relative position of the ring 13 and of the pawls 11 is maintained. The pawls 18 are overrun by the teeth 12. When back-pedaling is resumed briefly, the hub switches back to its lower transmission ratio in the same manner.

The back-pedaling movement necessary for switching from one speed to the other is too short to cause spreading of the brake sleeve 19 by the cone 15, and the cone reverts to its position illustrated in FIG. 1 as soon as forward pedaling starts. During a longer back-pedaling stroke which causes the hub shell 2 to be braked by the spreading sleeve 19, the cam-follower tongues 35 of the pawls 11 also move from the cam face sections 26 of the control ring 13 to the sections 30. When the brake is fully engaged, the pawls engage the coaxial cam face portions 31 adjacent the hub axis. When forward pedaling is resumed, the tongues 35 initially move along the cam face portions 31, and the tips of the tongues 37 do not yet engage the ratchet teeth 12. The drive sleeve 16 simultaneously turns in a forward direction, though more slowly than the pawls 11, and releases the brake cone 15 from the brake sleeve 19. When the tongues 35 reach the control portions 32 of the cam face and permit driving engagement of the tongues 37 with the ratchet teeth 12, the brake is fully released.

The specific configuration of the cam face sections 26, 30, as described with reference to FIGS. 2 and 5, thus causes a delay in the engagement of the pawls 11 with the ratchet teeth 12 after switching to the higher transmission ratio without requiring any supplemental devices.

When the control ring 13' illustrated in FIG. 3 is substituted for the ring 13, the angular movement of the driver 5 required for switching from the lower to the higher speed or transmission ratio is shortened by about 30% because of the different dimensional relationship of the cam face sections 26', 30'. Switching from high speed to low speed requires a longer driver movement, but this has not been found to cause inconvenience to the rider of the bicycle.

It should be understood, of course, that the foregoing disclosure relates only to a preferred embodiment of the invention, and that it is intended to cover all changes and modifications of the examples of the invention herein chosen for the purpose of the disclosure which do not constitute departures from the spirit and scope of the invention set forth in the appended claims.

What is claimed is:

1. A multiple-speed hub for a driven wheel of a vehicle comprising:
   (a) a shaft having an axis;
   (b) a hub shell mounted on said shaft for rotation about said axis;
   (c) a multiple-speed transmission mounted in said hub shell and including first and second transmission members operatively connected for simultaneous angular movement about said axis at different respective speeds;
   (d) drive means for angularly moving said members about said axis in a forward direction and in a backward direction;
   (e) brake means operatively interposed between said transmission and said hub shell for braking said rotation of the hub shell in response to backward angular movement of said members and for releasing the hub shell from the braking action in response to subsequent forward angular movement of said members;
   (f) an overrunning clutch interposed between said first transmission member and said hub shell;
   (g) a pawl member mounted on said second transmission member for joint angular movement;
   (h) ratchet means on said hub shell;
   (i) a control element mounted in said shell for rotation about said axis,
      (1) said control element having an annular cam face directed toward said axis,
      (2) said pawl member having a cam follower portion and a ratchet engaging tip portion;
   (j) biasing means biasing said pawl member toward a position of engagement of said cam follower portion with said cam face and of said tip portion with said ratchet means,
      (1) said cam face having at least one first circumferential section and at least one second circumferential section,
      (2) each of said sections having an arcuate, circumferential portion adjacent said axis, a circumferential control portion sloping radially outward from said adjacent portion toward the adjacent portion of the other section in the circumferential direction of forward angular movement of said second transmission member, and an abutment portion transverse to said adjacent and control portions,
      (3) the control portion of said first section extending far enough from said axis to permit driving engagement of said tip portion with said ratchet means when said cam follower portions engages said control portion of the first section,
      (4) the control portion of said second section when engaged by said cam follower portion preventing engagement of said tip portion when said ratchet means,
      (5) said pawl member abuttingly engaging said abutment portion when said second transmission member is moved by said drive means in said forward direction for rotating said control element about said axis,
      (6) the circumferential length of the adjacent portion of said first section being approximately two thirds of the combined circumferential length of said adjacent and control portions of said first section, and
      (7) the circumferential length of the adjacent portion of said second section being 25 to 50% of the combined circumferential length of said adjacent and control portions of said second section; and
   (k) friction means selectively impeding rotary movement of said control element with said pawl member when said second transmission member is moved by said drive means in said backward direction,
      (1) whereby said cam follower portion moves from camming engagement with one of said first and second sections into camming engagement with the other section during said backward moving of the transmission members,
      (2) the circumferential length of said adjacent portion of the first section being sufficient to permit releasing of said brake means during said forward moving of said second transmission member before said cam follower portion engages said control portion of the first section.

2. A hub as set forth in claim 1, wherein the circumferential length of said adjacent portion of the first section of said cam face is greater than the circumferential length of said adjacent portion of the second section.

3. A hub as set forth in claim 2, wherein said adjacent portion of said first section is longer by approximately 30% than said adjacent portion of the second section.

4. A hub as set forth in claim 1, wherein said pawl member is formed with a slot axially separating said cam follower portion from said tip portion, said biasing means including an annular spring member partly received in said slot.

5. A hub as set forth in claim 4, wherein said pawl has a bottom face in said slot and said cam follower portion is elongated and has an end face obliquely inclined to the direction of elongation thereof, said end face and said bottom face being substantially parallel.

6. A hub as set forth in claim 5, wherein the width of said cam follower portion in the direction of said axis is smaller than the corresponding dimension of said tip portion.

7. A hub as set forth in claim 1, wherein said overrunning clutch includes a pawl element on said first transmission member, said ratchet means including a plurality of ratchet teeth on said hub shell, the overrunning clutch further including additional biasing means biasing said pawl element toward driving engagement with said ratchet teeth, said pawl element and said pawl member being offset from said control element in opposite axial directions for engagement with said ratchet teeth, said control element including a spacer portion axially extending toward said pawl element.

8. A hub as set forth in claim 1, wherein said control element has a guide portion radially extending from said cam face toward said hub shell.

9. A hub as set forth in claim 1 wherein said cam face has two diametrically opposite first sections and two diametrically opposite second sections.

10. A hub as set forth in claim 9, wherein said first and second sections jointly extend about said axis in a closed loop.

11. A hub as set forth in claim 1, wherein each of said adjacent portions of said sections is of circularly arcuate cross section in a plane perpendicular to said axis.

12. A hub as set forth in claim 11, wherein each of said control portions of said sections is concavely arcuate and connected to the adjacent portion of the other section by one of said abutment portions.

13. A hub as set forth in claim 1, wherein the angular speed of said second transmission member is greater than the angular speed of said first transmission member during said simultaneous angular movement of said transmission members.

14. A hub as set forth in claim 13, wherein said abutment portion is abuttingly engaged by the cam follower portion of said pawl member when said second transmission member is moved by said drive means in said forward direction.

* * * * *